(12) United States Patent
Rottmayer et al.

(10) Patent No.: US 7,518,815 B2
(45) Date of Patent: Apr. 14, 2009

(54) HEAT ASSISTED MAGNETIC RECORDING HEAD WITH MULTILAYER ELECTROMAGNETIC RADIATION EMISSION STRUCTURE

(75) Inventors: Robert E. Rottmayer, Wexford, PA (US); Michael A. Seigler, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 632 days.

(21) Appl. No.: 11/286,720

(22) Filed: Nov. 23, 2005

(65) Prior Publication Data

US 2006/0083116 A1    Apr. 20, 2006

Related U.S. Application Data

(63) Continuation of application No. 10/226,805, filed on Aug. 23, 2002, now abandoned.

(60) Provisional application No. 60/373,500, filed on Apr. 18, 2002.

(51) Int. Cl.
*G11B 5/02* (2006.01)
(52) U.S. Cl. .................. 360/59; 369/13.13; 369/13.33
(58) Field of Classification Search ............. 369/13.13, 369/13.33; 360/59
See application file for complete search history.

(56) References Cited

U.S. PATENT DOCUMENTS

| | | | |
|---|---|---|---|
| 5,224,068 A | 6/1993 | Miyake et al. | |
| 5,674,638 A | 10/1997 | Grill et al. | |
| 5,696,372 A | 12/1997 | Grober et al. | |
| 5,771,216 A | 6/1998 | Tatsuzawa et al. | |
| 5,995,474 A | 11/1999 | Shimano et al. | |
| 6,130,864 A | 10/2000 | Burroughs | |
| 6,132,875 A | 10/2000 | Kiuchi et al. | |
| 6,192,008 B1 | 2/2001 | Kim | |
| 6,320,841 B1 | 11/2001 | Watanabe et al. | |
| 6,388,954 B1 | 5/2002 | Awano et al. | |
| 6,396,773 B1 | 5/2002 | Kuo | |
| 6,498,776 B1 | 12/2002 | Nakano et al. | |
| 6,618,330 B1 | 9/2003 | Kawasaki et al. | |
| 6,633,513 B1 | 10/2003 | Kim et al. | |

(Continued)

OTHER PUBLICATIONS

Y. Leviatan, "Study Of Near-Zone Fields Of A Small Aperture", *J. Appl. Phys.*, vol. 60, No. 5, Sep. 1986, pp. 1577-1583.

(Continued)

*Primary Examiner*—Tan X Dinh
(74) *Attorney, Agent, or Firm*—Benjamin T. Queen, II; Pietragallo Gordon Alfano Bosick & Raspanti, LLP

(57) ABSTRACT

A heat assisted magnetic recording head with a multilayer electromagnetic (EM) radiation emission structure. The multilayer EM radiation emission structure is in optical communication with a light source for heating a recording medium. Particularly, the multilayer EM radiation emission structure includes a conducting layer for receiving the light source and a protective layer formed adjacent the conducting layer to protect the conducting layer from contact with a recording medium. An aperture extends through the conducting layer in the protective layer to allow the light source to pass therethrough to heat the recording medium.

26 Claims, 4 Drawing Sheets

U.S. PATENT DOCUMENTS

| | | | |
|---|---|---|---|
| 6,704,249 B2 | 3/2004 | Yoshikawa et al. | |
| 6,714,370 B2 | 3/2004 | McDaniel et al. | |
| 6,760,278 B2 | 7/2004 | Matsumoto et al. | |
| 6,771,589 B2 * | 8/2004 | Ueyanagi et al. | 369/300 |
| 6,781,926 B2 | 8/2004 | Ishizaki et al. | |
| 6,795,380 B2 | 9/2004 | Akiyama et al. | |
| 6,844,983 B2 | 1/2005 | Lee et al. | |
| 2003/0123334 A1 | 7/2003 | Fujimaki et al. | |
| 2007/0081426 A1 * | 4/2007 | Lee et al. | 360/59 |
| 2007/0081427 A1 * | 4/2007 | Suh et al. | 360/59 |

OTHER PUBLICATIONS

R. D. Grober et al., "Optical Antenna: Towards A Unity Efficiency Near-Field Optical Probe", *Appl. Phys. Lett.*, vol. 70, No. 11, Mar. 1997, pp. 1354-1356.

X. Shi et al., "A Nano-Aperture With 1000X Power Throughput Enhancement For Very Small Aperture Laser System (VSAL)", *Proceedings of SPIE*, vol. 4342 (2002), pp. 320-327.

T. E. Schlesinger et al., "An Integrated Read/Write Head For Hybrid Recording", *Jpn. J. Appl. Phys.*, vol. 41, Pt. 1, No. 3B, (2002), pp. 1821-1824.

* cited by examiner

HEAT ASSISTED MAGNETIC RECORDING HEAD WITH MULTILAYER ELECTROMAGNETIC RADIATION EMISSION STRUCTURE

CROSS REFERENCE TO RELATED APPLICATION

This application is a continuation application and claims the benefit of U.S. application Ser. No. 10/226,805 filed Aug. 23, 2002. This application also claims the benefit of U.S. Provisional Application No. 60/373,500 filed Apr. 18, 2002.

STATEMENT REGARDING FEDERALLY SPONSORED RESEARCH OR DEVELOPMENT

This invention was made with the United States Government support under Agreement No. 70NANB1H3056 awarded by the National Institute of Standards and Technology (NIST). The United States Government has certain rights in the invention.

FIELD OF THE INVENTION

The invention relates to heat assisted magnetic recording heads, and more particularly, to a multilayer electromagnetic radiation emission structure for heat assisted magnetic recording.

BACKGROUND INFORMATION

Magnetic recording heads have utility in a magnetic disc drive storage system. There is a demand in the disc drive storage industry to develop magnetic recording heads having an increased areal storage density. However, one obstacle in achieving increased areal storage density is the "superparamagnetic limit", which is also sometimes referred to as the "superparamagnetic effect" This well known phenomenon generally refers to the point at which the thermal activity of an object, such as the individual grains that make up a recording layer of a magnetic recording medium, is so great that the magnetization is no longer stable, i.e. the object becomes thermally unstable and incapable of maintaining it's desired magnetization.

A development that overcomes at least some of the problems associated with the superparamagnetic limit is heat assisted magnetic recording, sometimes referred to as optical assisted or thermal assisted recording (all of which will be collectively referred to herein as "heat assisted magnetic recording"). Heat assisted magnetic recording generally refers to the concept of locally heating a recording medium to reduce the coercivity of the recording medium so that the applied magnetic writing field can more easily direct the magnetization of the recording medium during the temporary magnetic softening of the recording medium caused by the heat source. The heat assisted magnetic recording allows for the use of small grain media, which is desirable for recording at increased areal densities, with a larger magnetic anisotropy at room temperature and assuring a sufficient thermal stability.

More specifically, superparamagnetic instabilities become an issue as the grain volume is reduced in order to control media noise for high areal density recording. The superparamagnetic limit is most evident when the grain volume V is sufficiently small that the inequality $K_u V/k_B T > 40$ can no longer be maintained. $K_u$ is the material's magnetic crystalline anisotropy energy density, $k_B$ is Boltzmann's constant, and T is absolute temperature. When this inequality is not satisfied, thermal energy demagnetizes the individual grains and the stored data bits will not be stable. Therefore, as the grain size is decreased in order to increase the areal density, a threshold is reached for a given material $K_u$ and temperature T such that stable data storage is no longer feasible.

The thermal stability can be improved by employing a recording medium formed of a material with a very high $K_u$. However, with the available materials the recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity and assures thermal stability of the recorded information.

Various structures or devices have been proposed for heating a recording medium for heat assisted magnetic recording, such as, for example, a waveguide, a solid immersion lens or a surface plasmon lens. When applying a heat source to the recording medium, it is desirable to confine the heat to the track where writing is taking place. Thus, it is necessary to produce a very small, intense hot spot to heat the recording medium only in the desired location. To achieve the small, intense hot spot it has been proposed to use a near-field optical probe, such as an optical antenna, to focus optical energy through a very small aperture to produce the necessary thermal energy for heating the recording medium. Accordingly, various optical antenna designs having such a small aperture for creating the small, intense heat spot on the recording medium are known. For example, FIG. 1a illustrates a bow tie antenna 10a and FIG. 1b illustrates a circular antenna 10b, each having a small aperture area 12a and 12b respectively.

Such optical antennas are typically made from a suitable conducting material such as Au or Ag to support plasmons from a light beam that will propagate through the apertures 12a or 12b to generate the hot spot. However, such materials are generally mechanically soft and are not well suited to withstand the start/stop and intermittent contact with the recording medium that is typically existent in low flying disc recording systems.

Although it is generally known to provide an overcoat material, such as a diamond-like carbon overcoat (DLC) on the air-bearing surface (ABS) of a slider or a recording head, such an overcoat alone is not effective in protecting the proposed structures for heat assisted magnetic recording. For example, the DLC does not adhere well to the optical antenna designs formed of a material such as Au or Ag. In addition, the DLC depositions are usually done in chambers specifically designed for only DLC processing, which increases manufacturing costs.

Accordingly, there is identified a need for an improved heat assisted magnetic recording head that overcomes limitations, disadvantages, and/or shortcomings of known heat assisted magnetic recording heads.

SUMMARY OF THE INVENTION

Embodiments of the invention meet the identified needs, as well as other needs, as will be more fully understood following a review of the specification and drawings.

In accordance with an aspect of the invention, a heat assisted magnetic recording head for use in conjunction with a recording medium comprises means for applying a magnetic write field to the recording medium, means for providing a light source, and a multilayer electromagnetic (EM) radiation emission structure in optical communication with the means for providing a light source. The multilayer EM radiation emission structure defines an aperture that extends therethrough. The multilayer EM radiation emission structure may include a conducting layer in optical communication with the means for providing a light source and a protective layer formed between the conducting layer and the recording medium to protect the conducting layer from contact with the recording medium. The multilayer EM radiation emission structure may be, for example, an optical antenna.

In accordance with an additional aspect of the invention, a multilayer EM radiation emission structure in optical communication with a light source for heating a recording medium comprises a conducting layer for receiving the light source and a protective layer formed adjacent the conducting layer. The conducting layer defines a first aperture that extends therethrough. The protective layer defines a second aperture that extends therethrough and that is in alignment with the first aperture to allow the light source to pass therethrough to heat the recording medium. The multilayer EM radiation emission structure may also include an additional conducting layer formed on at least a portion of a sidewall of the first aperture and the second aperture. In addition, the multilayer heat emission structure may also include an additional protective layer formed on at least a portion of the additional conducting layer.

In accordance with another aspect of the invention, a method of making a multilayer EM radiation emission structure for use with a light source to heat a recording medium comprises depositing a conducting layer for optically communicating with the light source, depositing a protective layer adjacent the conducting layer for protecting the conducting layer from contact with the recording medium, and forming an aperture that extends through the conducting layer and the protective layer to allow the light source to pass therethrough to heat the recording medium.

DETAILED DESCRIPTION OF THE INVENTION

The invention provides a heat assisted magnetic recording head, and more particularly a multilayer electromagnetic (EM) radiation emission structure for heat assisted magnetic recording. The invention is particularly suitable for use with a magnetic disc drive storage system although it will be appreciated that the invention may also be used with other type storage systems, such as, for example, magneto-optical or optical storage systems. A recording head, as used herein, is generally defined as a head capable of performing read and/or write operations. Perpendicular magnetic recording, as used herein, generally refers to orienting magnetic domains within a magnetic storage medium substantially perpendicular to the direction of travel of the recording head and/or recording medium.

Figure 1A:
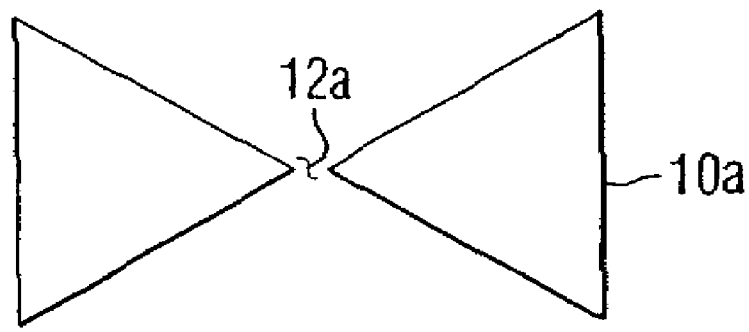
FIG. 1a is a top view of a bow tie optical antenna design that is generally known in the art.
Figure 1B:
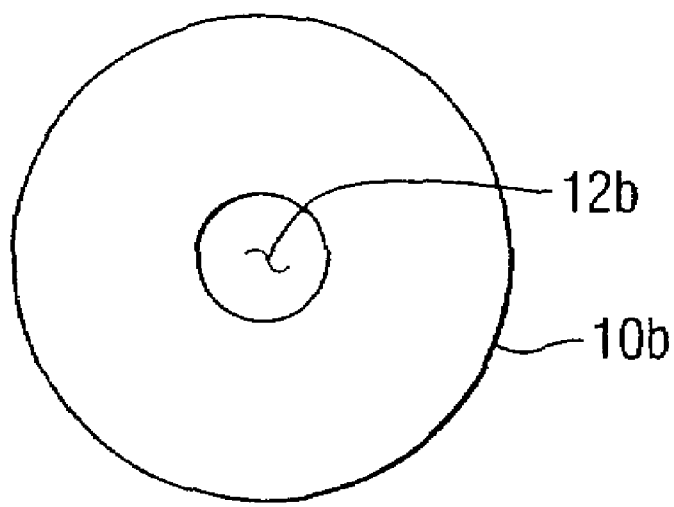
FIG. 1b is a top view of a circular optical antenna design that is generally known in the art.
Figure 2:
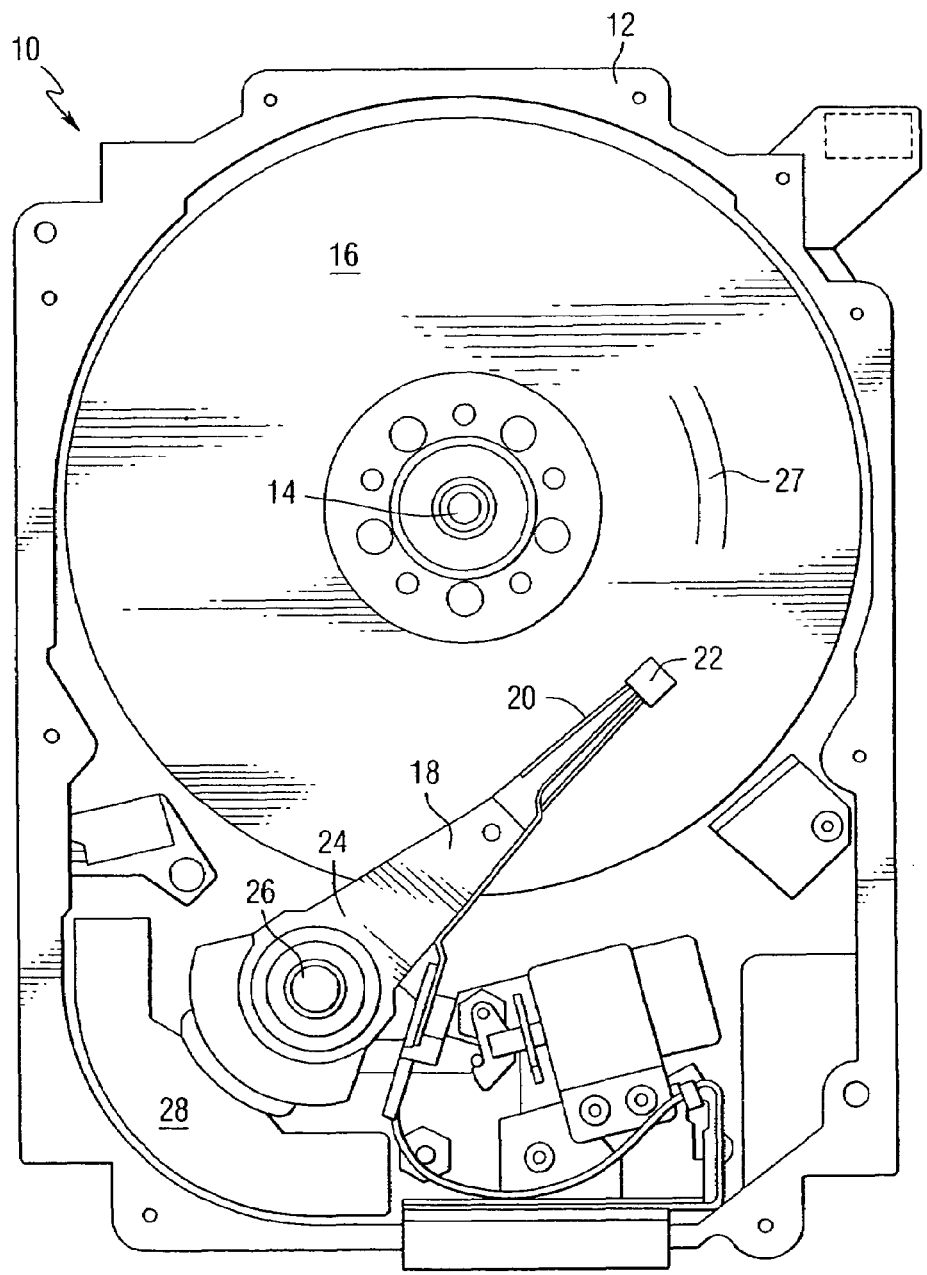
FIG. 2 is a pictorial representation of a disc drive system that may utilize a heat assisted magnetic recording head in accordance with the invention.

FIG. 2 is a pictorial representation of a disc drive 10 that can utilize a heat assisted magnetic recording head, which may be a perpendicular magnetic recording head, constructed in accordance with this invention. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 3:
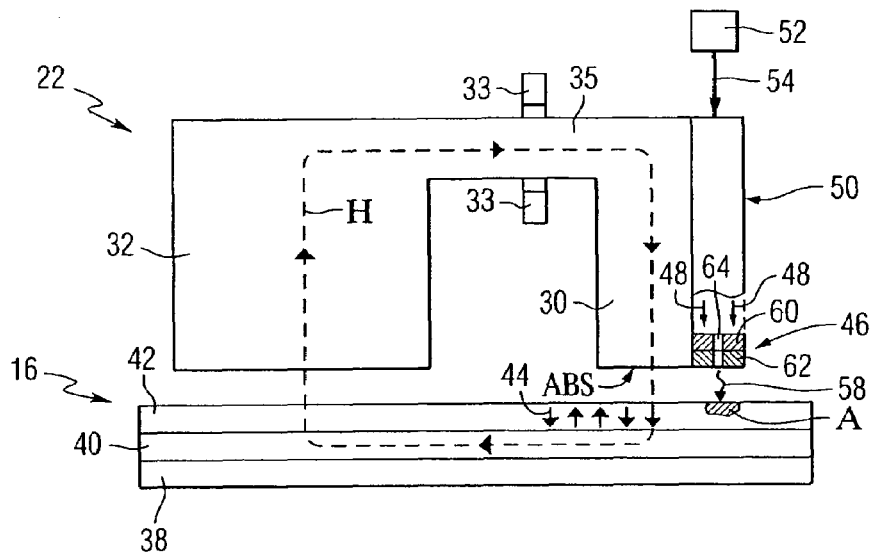
FIG. 3 is a partial schematic side view of a heat assisted magnetic recording head and a magnetic recording medium in accordance with the invention.

FIG. 3 is a partially schematic side view of a heat assisted magnetic recording head 22 and a magnetic recording medium 16. Although an embodiment of the invention is described herein with reference to recording head 22 as a perpendicular magnetic recording head and the medium 16 as a perpendicular magnetic recording medium, it will be appreciated that aspects of the invention may also be used in conjunction with other type recording heads and/or recording mediums where it may be desirable to employ heat assisted recording. Specifically, the recording head 22 may include a writer section comprising a main write pole 30 and a return or opposing pole 32 that are magnetically coupled by a yoke or pedestal 35. It will be appreciated that the recording head 22 may be constructed with a write pole 30 only and no return pole 32 or yoke 35. A magnetization coil 33 surrounds the yoke or pedestal 35 for energizing the recording head 22. The recording head 22 also may include a read head, not shown, which may be any conventional type read head as is generally known in the art.

Still referring to FIG. 3, the recording medium 16 is positioned adjacent to or under the recording head 22. The recording medium 16 includes a substrate 38, which may be made of any suitable material such as ceramic glass or amorphous glass. A soft magnetic underlayer 40 is deposited on the substrate 38. The soft magnetic underlayer 40 may be made of any suitable material such as, for example, alloys or multilayers having Co, Fe, Ni, Pd, Pt or Ru. A hard magnetic recording layer 42 is deposited on the soft underlayer 40, with the perpendicular oriented magnetic domains 44 contained in the hard layer 42. Suitable hard magnetic materials for the hard magnetic recording layer 42 may include at least one material selected from, for example, FePt or CoCrPt alloys having a relatively high anisotropy at ambient temperature.

The recording head 22 also includes means for providing a light source and a multilayer EM radiation emission structure 46 to heat the magnetic recording medium 16 proximate to where the write pole 30 applies the magnetic write field H to the recording medium 16. Specifically, the means for providing a light source may include, for example, an optical waveguide schematically represented by reference number 50. The optical waveguide 50 acts in association with a light source 52 which transmits light via an optical fiber 54 that is in optical communication with the optical waveguide 50. The light source 52 may be, for example, a laser diode, or other suitable laser light sources. This provides for the generation of a guided mode that may propagate through the optical waveguide 50 toward the multilayer EM radiation emission structure 46 (as indicated by arrows 48) that is formed along the air-bearing surface (ABS) of the recording head 22. EM radiation, generally designated by reference number 58, is transmitted from the EM radiation emission structure 46 for heating the recording medium 16, and particularly for heating a localized area "A" of the recording layer 42.

The optical waveguide 50 may include a light transmissive material in optical communication with the light source 52 and optical fiber 54, as is generally known. The light transmissive material provides for the described generation of a guided mode which propagates toward the EM radiation emission structure 46. The light transmissive material may be formed, for example, from a material, such as $SiO_2$, SiN or $TiO_2$, as is generally known.

In addition to the optical waveguide 50, the means for providing a light source may include other structures or devices such as, for example, a solid immersion lens.

Figure 4:
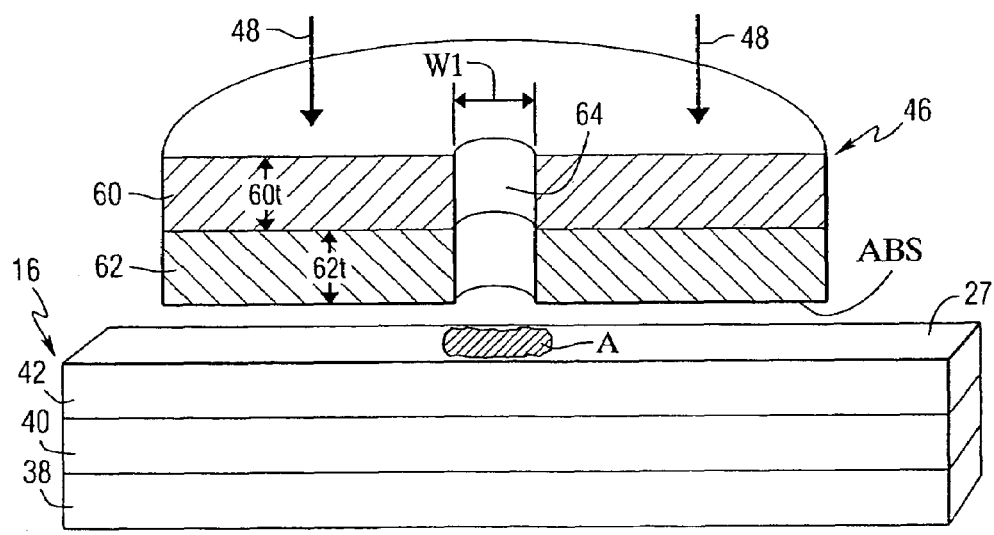
FIG. 4 is a partial sectional view of a multilayer EM radiation emission structure constructed in accordance with the invention.

Referring to FIGS. 3 and 4, the multilayer EM radiation emission structure 46 is illustrated, for example, in the form of a generally circular optical antenna. However, it will be appreciated that the multilayer EM radiation emission structure of the present invention may be constructed in various shapes and configurations, such as, for example, a bow tie optical antenna or a C-shaped optical antenna structure. Specifically, the EM radiation emission structure 46 includes a conducting layer 60 and a protective layer 62. The conducting layer 60 is positioned for optical communication with the light energy 48 that propagates from the optical waveguide 50, as described herein. The protective layer 62 is formed adjacent the conducting layer 60 and positioned between the conducting layer 60 and the recording medium 16 so as to protect the conducting layer 60 from contact with the recording medium 16.

The conducting layer 60 may comprise at least one material selected from the group consisting of Au, Ag, or Al. The conducting layer 60 may have a thickness 60$t$ in the range of about 10 nm to about 1000 nm.

The protective layer 62 may comprise at least one material selected from the group consisting of Ta, Ti, W, Mo or Cr. The protective layer 62 may have a thickness 62$t$ in the range of about 0.5 nm to about 100 nm.

As best shown in FIG. 4, the EM radiation emission structure 46 defines an aperture 64 that extends therethrough, and particularly extends through the conducting layer 60 and the protective layer 62. The propagating light 48 impinges upon the conducting layer 60 of the EM radiation emission structure 46. The aperture 64 may serve as a filter to filter out all of the light outside of the aperture width W1, or surface plasmons may be generated by the light 48 impinging upon the conducting layer 60. If plasmons are generated, they may propagate along the surface of the layer 60 to the aperture 64 and enhance the amount of light passing therethrough.

As it is important to develop a small, intense hot spot to heat the area "A" of the recording medium 16, the aperture 64 has a width W1 in the range of about 1 nm to about 250 nm.

The formation of the EM radiation emission structure 46 having the protective layer 62 between the conducting layer 60 and the recording medium 16 is beneficial because, as stated, the conducting layer 60 is formed of a mechanically soft conducting material that is not well suited to withstand any possible start/stop and intermittent contact that may occur with the recording medium, as is typically existent in low flying magnetic disc recording systems. The protective layer 62 better serves to protect the conducting layer 60 than other known techniques that are employed for protecting recording heads, and particularly the ABS thereof, from contact with the recording medium 16. Such known techniques include, for example, providing an overcoat material, such as a diamond-like carbon overcoat (DLC) on the ABS of a slider or a recording head 22.

An advantage of having the protective layer 62 as opposed to merely relying on the DLC overcoat is that the mechanically hard protective layer 62 adheres better to the conducting layer 60 as compared to the adhesion of the DLC overcoat to the conducting layer 60.

Another advantage is that the material for forming the protective layer 62 may be chosen such that the DLC overcoat adheres well thereto and the DLC overcoat more easily forms a thin uniform coating. It will be appreciated that the EM radiation emission structure 46 may also include, if desired, a DLC overcoat applied to the ABS thereof, i.e., a DLC overcoat applied to the ABS of the protective layer 62. Specifically, the thin film growth mode is mainly governed by surface and interface free energies. For example, if the conducting layer 60 is formed of Au (which has a relatively low surface free energy) and if it does not form a suitably strong bond with the C of the DLC overcoat, a thin continuous layer of DLC will not be possible. On the other hand, if the protective layer 62 is formed of Ta which may form bonds with Au, it may effectively coat the Au and then a thin DLC coating could be applied to the Ta protective layer 62.

Another advantage of employing the protective layer 62 as opposed to using the DLC overcoat, is that the protective layer 62 actually defines a portion of the aperture 64. This means that the protective layer 62 can be made much thicker than the layer of DLC overcoat and, therefore, more reliable than the DLC overcoat.

Yet another advantage of the protective layer 62 is that it can reduce the edge coupling of the plasmons to the medium 16 and since the plasmons would not propagate along the hard protective layer 62, the thermal profile would be much sharper with reduced side heating.

Figure 5:
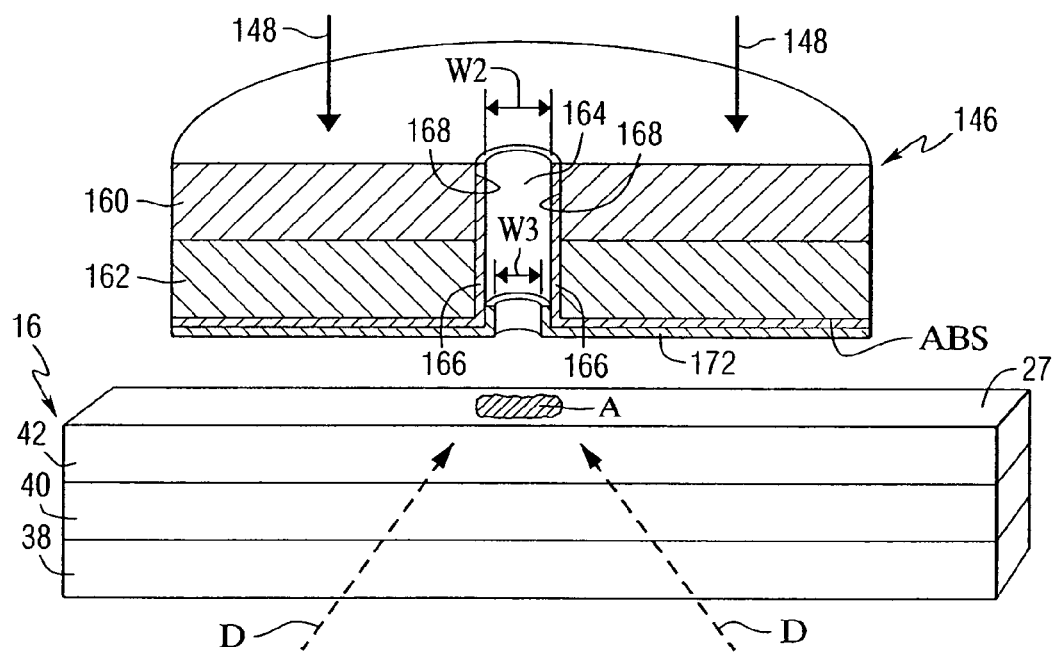
FIG. 5 is an additional embodiment of a multilayer EM radiation emission structure constructed in accordance with the invention.

Referring to FIG. 5, there is illustrated an additional embodiment of the invention which includes a multilayer EM radiation emission structure 146 that is similar to the multilayer EM radiation emission structure 46 described herein. Specifically, the EM radiation emission structure 146 may include a conducting layer 160 and a protective layer 162. The conducting layer 160 and the protective layer 162 define an aperture 164 that extends therethrough. The EM radiation emission structure 146 may include an additional conducting layer 166 that may be formed on at least a portion of a sidewall 168 of the aperture 164 and/or on at least a portion of the ABS of the EM radiation emission structure 146. The additional conducting layer 166 may comprise at least one material selected from the group consisting of Au, Ag, or Al. An advantage of having an additional conducting layer 166, and particularly of having an additional conducting layer 166 formed on at least a portion of the sidewall 168 of the aperture 164, is that the width of the aperture 164 may be reduced to a width of W2 to allow for the generation of an even smaller, intense hot spot "A" on the recording medium 16. W2 may be in the range of about 1 nm to about 50 nm.

Still referring to FIG. 5, the EM radiation emission structure 146 may also include an additional protective layer 172 that may be formed on at least a portion of the additional conducting layer 166. The protective layer 162 may or may not be used in conjunction with the additional protective layer 172. The additional protective layer 172 may comprise at least one material selected from the group consisting of Ta, Ti, W, Mo or Cr. An advantage of providing the additional protective layer 172 is that the width of the aperture 164 may be further reduced to the width W3 to produce an even smaller, intense hot spot for heating the recording medium 16. W3 may be in the range of about 1 nm to about 50 nm. In addition, it will be appreciated that the additional protective layer may be formed directly on at least a portion of the sidewall 168 of the aperture 164 or on the ABS of the heat emission structure 146.

In the situation where surface plasmons are being generated, the layer 162 would need to be made of a material, such as Au, Ag, or Al, that would support propagation of these plasmons. The protective layer 172 may or may not be used to further reduce the width of the aperture 164. However, the protective layer 172 would need to be constructed of a material, such as Ta, Ti, W, Mo, or Cr, that would stop the propagation of the plasmons and allow for the energy to be transmitted to the recording medium 16 to heat the localized area A thereof.

If surface plasmons are not being utilized, the layer 162 could be formed of any non-transparent material, such as Ta, Ti, W, Mo, Cr, Zr, Nb, Al, or Ag. The protective layer 172 would then be needed to protect the layer 162 in the event that it was formed of a relatively soft material.

The means for providing a light source and the EM radiation emission structures 46 and 146 may be located adjacent to the write pole 30. Advantageously, this would allow for heating of the recording medium 16 in close proximity to where the write pole 30 applies the magnetic write field H to the recording medium 16. It also provides for the ability to align the EM radiation emission structures 46 and 146 with the write pole 30 to maintain the heating application in the same track 27 of the medium 16 where the writing is taking place. Locating the EM radiation emission structures 46 and 146 adjacent to the write pole 30 provides for increased writing efficiency due to the write field H being applied immediately downtrack from where the recording medium 16 has been heated. It will be appreciated that the structures 46 and/or 146 may be positioned in different locations relative to the write pole 30 for heating the medium 16 either before, after or at about the same time as the write field H is applied.

In operation, the recording medium 16 is passed under the recording head 22. The recording medium 16 may travel in either direction under the recording head 22 since the write pole 30 and the EM radiation emission structure 46 are located in close proximity. The light source 52 transmits light energy via the optical fiber 54 to the optical waveguide 50. The optical waveguide 50 transmits the light energy to the EM radiation emission structure 46 or 146 for heating the recording medium 16. More specifically, a localized area A of the recording layer 42 is heated to lower the coercivity thereof prior to the write pole 30 applying a magnetic write field H to the recording medium 16. Advantageously, this allows for a higher coercivity medium material to be used which limits the superparamagnetic instabilities that may occur with such recording media used for high recording densities.

At a downtrack location from where the medium 16 is heated, the magnetic write pole 30 applies a magnetic write field to the medium 16 for storing magnetic data in the recording medium 16. The write field H is applied while the recording medium 16 remains at a sufficiently high temperature for lowering the coercivity of the recording medium 16. This insures that the write pole 30 can provide a sufficient or strong enough magnetic write field to perform a write operation on the recording medium 16.

The invention also includes a method for making the multilayer EM radiation emission structures 46 and 146. Specifically, the method includes depositing the conducting layer 60 for optically communicating with the means for providing a light source as described herein. The method also includes depositing the protective layer 62 adjacent the conducting layer 60 such that the protective layer 62 is positioned for protecting the conducting layer 60 from contact that may occur with the recording medium 16. The protective layer 62 may be deposited so as to be in direct contact with the conducting layer 60 or an interlayer could be used therebetween to promote adhesion between the conducting layer 60 and the protective layer 62. The depositing of the conducting layer 60 and the protective layer 62 may be carried out using conventional deposition techniques such as, for example, sputtering or ion beam deposition.

The method also includes forming the aperture 64 that extends through the conducting layer 60 and the protective layer 62 to allow the light energy to pass therethrough to heat the recording medium 16. Formation of the aperture 64 may include some additional post-deposition processing. For example, known techniques of an etching process or a lift-off process could be utilized in forming the aperture 64.

The method of making the EM radiation emission structure 146, illustrated in FIG. 5, may include additional steps to deposit the additional conducting layer 166 and/or the additional protective layer 172. The deposition of the additional conducting layer 166 and/or the additional protective layer 172 may be carried out using a directional deposition technique such as, for example, ion beam deposition, evaporation, or collimated sputtering which would provide for sufficient film growth rate on the sidewall 168 of the aperture 164. The directional deposition of the additional conducting layer 166 and/or the additional protective layer 172 is applied, as indicated by arrows D at an angle with respect to the plane of the conducting layer 160 and the protective layer 162. The angle of the deposition D and the angle at which the incoming material would make contact with the surface can be used to control how deep the conductive layer 166 and/or the protective layer 172 extends into the aperture 164. This further enhances the ability to form the additional conducting layer 166 and/or the additional protective layer 172 on the sidewall 168.

Whereas particular embodiments have been described herein for the purpose of illustrating the invention and not for the purpose of limiting the same, it will be appreciated by those of ordinary skill in the art that numerous variations of the details, materials, and arrangement of parts may be made within the principle and scope of the invention without departing from the invention as described in the appended claims.

What is claimed is:

1. A heat assisted magnetic recording head for use in conjunction with a recording medium, comprising:
   means for applying a magnetic write field to the recording medium;
   means for providing a light source;
   a multilayer electromagnetic radiation emission structure including a conducting layer in optical communication with said means for providing a light source, said multilayer electromagnetic radiation emission structure further including a protective layer formed between said conducting layer and the recording medium, said conducting layer and said protective layer defining an aperture that extends therethrough; and
   an additional conducting layer formed on at least a portion of a sidewall of said aperture.

2. The heat assisted magnetic recording head of claim 1, wherein said conducting layer comprises at least one material selected from the group consisting of Au, Ag, or Al.

3. The heat assisted magnetic recording head of claim 1, wherein said conducting layer has a thickness in the range of about 10 nm to about 1000 nm.

4. The heat assisted magnetic recording head of claim 1, wherein said protective layer comprises at least one material selected from the group consisting of Ta, Ti, W, Mo, or Cr.

5. The heat assisted magnetic recording head of claim 1, wherein said protective layer has a thickness in the range of about 0.5 nm to about 100 nm.

6. The heat assisted magnetic recording head of claim 1, wherein said aperture has a width in the range of about 1 nm to about 250 nm.

7. The heat assisted magnetic recording head of claim 1, wherein said multilayer electromagnetic radiation emission structure is an optical antenna.

8. A multilayer electromagnetic radiation emission structure in optical communication with a light source for heating a recording medium, comprising:
    a conducting layer for receiving the light source, said conducting layer defining a first aperture that extends therethrough;
    a protective layer formed adjacent said conducting layer, said protective layer defining a second aperture that extends therethrough and that is aligned with said first aperture to allow the light source to pass through said first and second apertures to heat the recording medium; and
    an additional conducting layer formed on at least a portion of a sidewall of said first aperture and/or on at least a portion of a sidewall of said second aperture.

9. The multilayer electromagnetic radiation emission structure of claim 8, wherein said conducting layer and/or said additional conducting layer comprises at least one material selected from the group consisting of Au, Ag, or Al.

10. The multilayer electromagnetic radiation emission structure of claim 8, further including an additional protective layer formed on at least a portion of said additional conducting layer.

11. The multilayer electromagnetic radiation emission structure of claim 10, wherein said protective layer and/or said additional protective layer comprises at least one material selected from the group consisting of Ta, Ti, W, Mo, or Cr.

12. The multilayer electromagnetic radiation emission structure of claim 8, wherein said first aperture and/or said second aperture has a width in the range of about 1 nm to about 250 nm.

13. A method of making a multilayer electromagnetic radiation emission structure for use with a light source to heat a recording medium, comprising:
    depositing a conducting layer for optically communicating with the light source;
    depositing a protective layer adjacent the conducting layer for protecting the conducting layer from contact with the recording medium;
    forming an aperture that extends through the conducting layer and the protective layer to allow the light source to pass therethrough to heat the recording medium; and
    depositing an additional conducting layer on at least a portion of a sidewall of the aperture.

14. The method of claim 13, wherein the depositing of an additional conducting layer is performed by a directional deposition technique.

15. The method of claim 13, further including depositing an additional protective layer on at least a portion of the additional conducting layer.

16. The method of claim 15, wherein the depositing of an additional protective layer is performed by a directional deposition technique.

17. A heat assisted magnetic recording head for use in conjunction with a recording medium, comprising:
    a magnetic write element;
    a light source;
    a multilayer electromagnetic radiation emission structure including a conducting layer in optical communication with said light source, said multilayer electromagnetic radiation emission structure further including a protective layer formed between said conducting layer and the recording medium, said conducting layer and said protective layer defining an aperture that extends therethrough; and
    an additional conducting layer formed on at least a portion of a sidewall of said aperture.

18. The heat assisted magnetic recording head of claim 17, wherein said conducting layer comprises at least one material selected from the group consisting of Au, Ag, or Al.

19. The heat assisted magnetic recording head of claim 17, wherein said conducting layer has a thickness in the range of about 10 nm to about 1000 nm.

20. The heat assisted magnetic recording head of claim 17, wherein said protective layer comprises at least one material selected from the group consisting of Ta, Ti, W, Mo, or Cr.

21. The heat assisted magnetic recording head of claim 17, wherein said protective layer has a thickness in the range of about 0.5 nm to about 100 nm.

22. An apparatus, comprising:
    a data storage write element;
    an optical waveguide adjacent said data storage write element;
    a conducting layer in communication with said optical waveguide;
    a protective layer adjacent said conducting layer, said conducting layer and said protective layer defining an aperture that extends therethrough; and
    an additional conducting layer formed on at least a portion of a sidewall of said aperture.

23. The apparatus of claim 22, wherein said conducting layer comprises at least one material selected from the group consisting of Au, Ag, or Al.

24. The apparatus of claim 22, wherein said conducting layer has a thickness in the range of about 10 nm to about 1000 nm.

25. The apparatus of claim 22, wherein said protective layer comprises at least one material selected from the group consisting of Ta, Ti, W, Mo, or Cr.

26. The apparatus of claim 22, wherein said protective layer has a thickness in the range of about 0.5 nm to about 100 nm.

* * * * *